United States Patent
Churchill

(10) Patent No.: US 8,010,308 B1
(45) Date of Patent: Aug. 30, 2011

(54) INERTIAL MEASUREMENT SYSTEM WITH SELF CORRECTION

(75) Inventor: David L. Churchill, Burlington, VT (US)

(73) Assignee: Microstrain, Inc., Williston, VT (US)

( * ) Notice: Subject to any disclaimer, the term of this patent is extended or adjusted under 35 U.S.C. 154(b) by 269 days.

(21) Appl. No.: 12/277,244

(22) Filed: Nov. 24, 2008

Related U.S. Application Data

(60) Provisional application No. 61/004,118, filed on Nov. 23, 2007.

(51) Int. Cl.
*G01C 25/00* (2006.01)
*G06F 19/00* (2011.01)

(52) U.S. Cl. ........... 702/104; 73/1.01; 73/1.37; 73/1.38; 73/1.75; 702/150

(58) Field of Classification Search ............ 73/1.01, 73/1.37, 1.38, 1.75, 1.76, 1.77, 1.79, 1.81, 73/178 R, 432.1, 865.8, 865.9; 701/1, 200, 701/224; 702/1, 85, 92, 93, 104, 127, 150, 702/151, 154, 187, 189

See application file for complete search history.

(56) References Cited

U.S. PATENT DOCUMENTS

| | | | |
|---|---|---|---|
| 3,281,581 A * | 10/1966 | Lerman et al. | 33/321 |
| 3,648,525 A * | 3/1972 | Reed | 74/5.34 |
| 5,235,514 A * | 8/1993 | Matsuzaki | 701/221 |
| 5,319,561 A * | 6/1994 | Matsuzaki | 701/221 |
| 5,645,077 A * | 7/1997 | Foxlin | 600/587 |
| 5,807,284 A * | 9/1998 | Foxlin | 600/595 |
| 5,887,351 A | 3/1999 | Arms et al. | |
| 5,935,191 A * | 8/1999 | Sakanashi et al. | 701/207 |
| 5,956,660 A * | 9/1999 | Neumann | 702/150 |
| 6,162,191 A * | 12/2000 | Foxlin | 600/595 |
| 6,305,221 B1 | 10/2001 | Hutchings | |
| 6,361,507 B1 * | 3/2002 | Foxlin | 600/595 |
| 6,529,127 B2 | 3/2003 | Townsend | |
| 6,786,877 B2 * | 9/2004 | Foxlin | 600/587 |
| 6,834,436 B2 | 12/2004 | Townsend | |
| 6,871,413 B1 | 3/2005 | Arms | |
| 7,081,693 B2 | 7/2006 | Hamel | |
| 7,143,004 B2 | 11/2006 | Townsend | |

(Continued)

OTHER PUBLICATIONS

U.S. Appl. No. 12/173,017, filed Jul. 14, 2008, Arms, non-published patent application. Eric Foxlin , Pedestrian tracking with shoe-mounted intertial sensors,IEEE computer graphics and applications, 0272-1716/05, Nov.-Dec. 2005. USA.
Rantakokko, J. et al., Positioning of emergency personnel in rescue operations—possibilities and vulnerabilities with existing techniques and identification of needs for future R&D, Technical report TRITA-EE, Sponsored by the Swedish Defence Research Agency, Stockholm, Jul. 2007.

(Continued)

*Primary Examiner* — Edward R Cosimano
(74) *Attorney, Agent, or Firm* — James Marc Leas

(57) ABSTRACT

A method of navigation includes providing an angular rate sensor and a direction-of-gravity reference. The method also includes determining bias error of the angular rate sensor about a vertical axis based on data substantially from the angular rate sensor and from the direction-of-gravity reference. In one embodiment, the first angular rate sensor is moved from a first position around a substantially horizontal axis to a second position around the substantially horizontal axis. The first angular rate sensor provides angular rate data for attitude at the first position and for compass heading at the second position. Data from the first angular rate sensor and from the direction-of-gravity reference is processed with a program for determining a bias error correction for the first angular rate sensor while the first angular rate sensor is in the first position. Bias error correction determined while the first angular rate sensor is in the first position is used to correct angular rate of the first angular rate sensor while the first angular rate sensor is in the second position.

39 Claims, 11 Drawing Sheets

U.S. PATENT DOCUMENTS

| | | | |
|---|---|---|---|
| 7,170,201 | B2 | 1/2007 | Hamel |
| 7,210,240 | B2 | 5/2007 | Townsend |
| 7,366,612 | B2 * | 4/2008 | Yang et al. .................... 701/220 |
| 7,672,781 | B2 * | 3/2010 | Churchill et al. ............. 701/220 |
| 2003/0023192 | A1 * | 1/2003 | Foxlin .......................... 600/595 |
| 2004/0078662 | A1 | 4/2004 | Hamel |
| 2005/0065728 | A1 * | 3/2005 | Yang et al. .................... 701/220 |
| 2005/0105231 | A1 | 5/2005 | Hamel |
| 2005/0116544 | A1 | 6/2005 | Hamel |
| 2005/0116545 | A1 | 6/2005 | Hamel |
| 2005/0140212 | A1 | 6/2005 | Hamel |
| 2005/0146220 | A1 | 7/2005 | Hamel |
| 2006/0103534 | A1 | 5/2006 | Arms |
| 2007/0073482 | A1 * | 3/2007 | Churchill et al. ............. 701/220 |
| 2008/0294342 | A1 * | 11/2008 | Hoshizaki et al. ............ 701/216 |

OTHER PUBLICATIONS

Randell, C. et al, "Personal Position Measurement Using Dead Reckoning", Proceedings of the Seventh IEEE International Symposium on Wearable Computers (ISWC'03), 1530-0811/03 $ 17.00 © 2003 IEEE.

Beauregard, "Omnidirectional Pedestrian Navigation for First Responders", Technologie-Zentrum Informatik, University at Bremen, 28359 Bremen, Germany.

Vissiere, D. et al, "Using magnetic disturbances to improve IMU-based position estimation", Proc. of the European Control Conf., Kos, Greece, Jul. 2-5, 2007.

Savage, Paul G., Strapdown Analytics, book published by Strapdown Associates, Inc., Maple Plain, MN, 1997.

* cited by examiner

INERTIAL MEASUREMENT SYSTEM WITH SELF CORRECTION

RELATED PATENT APPLICATIONS AND PRIORITY

This application claims priority of now expired Provisional Patent Application 61/004,118, filed Nov. 23, 2007, incorporated herein by reference.

FIELD

This patent application generally relates to navigation and to orientation sensing. More particularly it relates to inertial measurement systems. Even more particularly it relates to an inertial measurement system that corrects itself for bias error.

BACKGROUND

Personnel location tracking in areas where GPS signals are intermittent or unavailable has been an important consideration for military, firefighting, and consumer markets. Several researchers have reported on foot-borne micro-electromechanical sensors (MEMS) for personnel navigation. These sensors may include accelerometers, angular rate sensors, and magnetometers.

Schemes for navigation that include MEMS angular rate sensors have long been known that provide for correction of pitch and roll angular rate sensor bias error with accelerometers. Correction of yaw (compass heading) angular rate sensor bias error has not been possible just with accelerometers, as described in a paper by Eric Foxlin, "Pedestrian Tracking with Shoe-Mounted Inertial Sensors," *IEEE Computer Graphics and Applicatons*, November/December, 2005, ("the Foxlin paper,") incorporated herein by reference. While the author takes advantage of the zero-velocity state achieved with each foot fall to provide substantial navigation information, as the author states, "yaw (heading) and the yaw angular rate sensor bias are the only important extended Kalman filter states that aren't observable from zero-velocity measurements." The Foxlin paper provides three solutions:

"using a much higher-performance angular rate sensor at least for the yaw axis which exhibits negligible drift over the time period . . . ;

providing heading-correcting measurements from a magnetic compass; or providing position-correction measurements from GPS or other external aiding technologies."

A much higher-performance angular rate sensor is, of course, much more expensive, and GPS is often not available indoors and in outdoor locations between tall buildings. While a magnetic compass (magnetometers) has often been used as a reference to stabilize compass heading measurements, magnetometers have themselves been subject to error because of strong and unpredictable distortions of Earth's geomagnetic field, particularly in indoor environments.

Thus, a better system for reducing heading angular rate sensor bias error in personnel navigation and location tracking with MEMS and other low-cost sensors has been needed that does not rely on expensive angular rate sensors, GPS, or magnetometers. A better system has also been needed in attitude and heading reference systems (AHRS). Several embodiments of such a system are provided in this patent application.

SUMMARY

One aspect of the present patent application is a method of navigation, comprising providing an angular rate sensor and a direction-of-gravity reference. The method also includes determining bias error of the angular rate sensor about a vertical axis based on data substantially from the angular rate sensor and from the direction-of-gravity reference.

Another aspect is a method of navigation, comprising providing an angular rate sensor and an inertial sensor. The method also includes determining bias error of the angular rate sensor about a vertical axis based substantially on data from the angular rate sensor and from the inertial sensor.

Another aspect is a method of navigation, comprising providing a first angular rate sensor and a direction-of-gravity reference. It also includes moving the first angular rate sensor from a first position around a substantially horizontal axis to a second position around the substantially horizontal axis. In the method, the first angular rate sensor provides angular rate data for attitude at the first position and for compass heading at the second position. The method also includes processing data from the first angular rate sensor and from the direction-of-gravity reference with a program for determining a bias error correction for the first angular rate sensor while the first angular rate sensor is in the first position. It also includes using the bias error correction determined while the first angular rate sensor is in the first position to correct angular rate of the first angular rate sensor while the first angular rate sensor is in the second position.

Another aspect is a sensing unit, comprising a direction-of-gravity reference and a first angular rate sensor. The sensing unit also includes an actuator mounted to provide movement of the first angular rate sensor from a first position around a substantially horizontal axis to a second position around the substantially horizontal axis, wherein the first angular rate sensor provides angular rate data for attitude at the first position and wherein the first angular rate sensor provides angular rate data for compass heading at the second position. The sensing unit also includes a processor connected to receive data from the first angular rate sensor and from the direction-of-gravity, wherein the processor runs a program for determining a bias error correction for the first angular rate sensor while the first angular rate sensor is in the first position and for using the bias error correction to correct angular rate determined by the first angular rate sensor while the first angular rate sensor is in the second position.

BRIEF DESCRIPTION OF THE DRAWINGS

The foregoing will be apparent from the following detailed description, as illustrated in the accompanying drawings, in which.

DETAILED DESCRIPTION

Figure 1A:
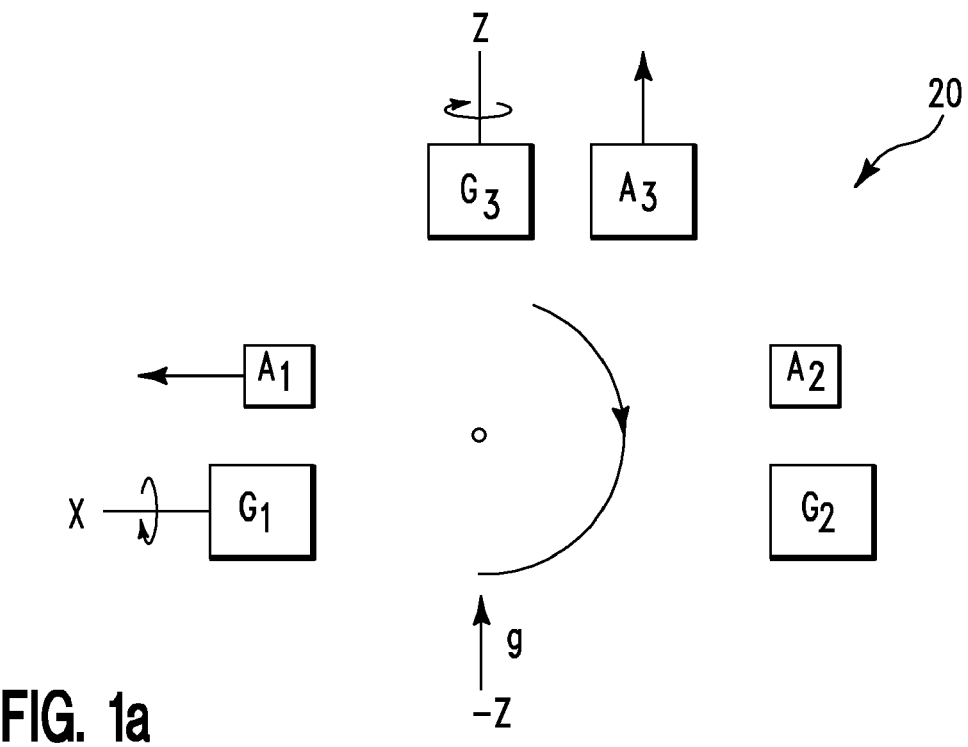
FIG. 1a, 1b are schematic diagrams showing the inertial sensing unit of the present patent application as it tumbles from a first position with angular rate sensor G3 oriented vertically to a second position with angular rate sensor G3 oriented horizontally.

The present applicant recognized a solution that overcomes the problem identified in the prior art with determining compass heading angular rate sensor bias error with accelerometers. This system provides an inertial measurement unit that automatically corrects for compass heading angular rate sensor bias error and improves navigation accuracy without resort to magnetometers, GPS, or the expensive angular rate sensors specified in the prior art. The system of the present patent application uses only an accelerometer for measuring and correcting for compass heading angular rate sensor bias error.

The bias of an angular rate sensor is the output of that sensor when the angular rate input is zero, that is when it is not actually rotating. Accurate knowledge of the bias allows correction of raw sensor output. Bias of an angular rate sensor is typically measured during a calibration procedure that provides bias calibration coefficients. Correction of the raw sensor output with these bias calibration coefficients is often performed during conversion to an accurate angular rate measurement when scaled into physical units, such as degrees per second.

In principle, a system that simply time integrates the outputs of three calibrated orthogonal angular rate sensors would be capable of measuring attitude and heading over time, given an accurate initialization. But angular rate sensors, particularly low cost MEMS models, often have bias errors. An angular rate sensor bias error occurs when the actual bias is different from what is expected based on the calibration. In typical angular rate sensors, the actual bias gradually changes over time. If this drift in the bias is not detected and corrected on a continuing basis a slowly varying bias error occurs. For low cost angular rate sensors, this slowly varying bias error has been statistically modeled as a Markov process with a time constant in the range of 10 to 1000 seconds.

Since the sensor outputs are time integrated to form the attitude and heading estimate, any angular rate sensor bias errors will cause slowly growing errors in that estimate to grow continuously without bound. The angular rate sensor bias error when integrated over time gives rise to an error in attitude and heading proportional to time. That gives rise to a velocity error proportional to time squared which gives rise to a position error that grows as time cubed. Therefore, detecting and correcting for the angle errors formed in the angular rate sensor will greatly improve determination of orientation, velocity, and position. In addition, by measuring and correcting for angular rate sensor bias errors, the primary source of the growing angle errors will be eliminated.

Correction of angular rate sensor bias error uses a sensor fusion filter, an algorithm designed to combine multiple sensor outputs in a manner that produces a better estimate of the target quantity than any single sensor could provide by itself. Fundamental to the operation of a sensor fusion filter for correction of such bias error is the ability to form an observable difference. An observable difference is formed when two independent measurements can be made of the same quantity. By comparing these two measurements, the error present in the system can be obtained. A well designed filter can then go on to estimate and correct that error.

Embodiments of the present patent application would benefit various types of systems, including an attitude and heading reference system (AHRS) and an inertial personnel tracking system. An AHRS is a system designed to estimate orientation of the device on which it is mounted, including attitude and heading. Attitude is defined as the orientation of the device with respect to the vertical axis as defined by the direction of the local gravity vector. Often this is quantified in terms of a pitch angle and a roll angle. Heading is defined as the orientation of the device about the vertical axis, and is often quantified in terms of a compass heading or yaw angle.

In addition to angular rate sensors, the AHRS may incorporate a direction-of-gravity reference, such as a tri-axial accelerometer configured as a tilt sensor. A direction-of-gravity reference can also be obtained from the surface of a liquid or from a plumb line. The output of the direction-of-gravity reference provides a measurement of pitch and roll independent of the measurement obtained by time integrating the output of the angular rate sensors. The two independent measurements, and the observable difference between them, have in the past just been used to determine angular rate sensor bias errors for pitch and roll. In this patent application they are used for determining the angular rate sensor bias errors for pitch, roll, and yaw.

In one embodiment, the inertial measurement unit rotates around a horizontal axis. Data from the angular rate sensors and accelerometers at multiple positions around the horizontal axis are used for calculating and correcting compass heading angular rate sensor bias error for this angular rate sensor.

Of course, as the Foxlin paper points out, for a stationary inertial sensing unit, data from accelerometers provides no information about compass heading rotation around the direction of the gravity vector. Thus, as mentioned in the prior art, no correction for angular rate sensor bias error was previously available from the accelerometers for the angular rate sensor measuring rotation around the vertical axis.

The present applicant found a way to overcome this limitation. In one embodiment, the inertial sensing unit of the present patent application is rotated 90 degrees, so a angular rate sensor otherwise used for measuring angular rate of change around the vertical axis now measures rate of rotation around a horizontal axis. For the angular rate sensor now in this horizontal orientation, an accelerometer can be used as a reference to measure and to correct that angular rate sensor's bias error. The present applicant recognized that once corrected, that angular rate sensor will operate with substantially corrected bias error for a period of time. Repeated corrections as the angular rate sensor continues to rotate around the horizontal axis remain with the angular rate sensor and can be used when it rotates into a vertical orientation where it then more accurately measures rate of change of compass heading.

In one embodiment the bias error is automatically repeatedly measured and corrected at a rate in the range from 10 to 1000 times per second while the inertial measuring unit rotates. The ability to detect and correct angular rate sensor bias error is most effective when the angular rate sensor axis is horizontal. The ability to detect and correct angular rate sensor bias error declines as the angular rate sensor axis rotates toward the vertical and as the horizontal component of the angular rate sensor axis declines. Thus, angular rate sensor bias error measured and corrected while the angular rate sensor is oriented substantially horizontally is used to provide more accurate output when the angular rate sensor is oriented vertically.

Thus, with only an accelerometer and a scheme to rotate the inertial sensing unit around a horizontal axis, applicant was able to determine and correct the angular rate sensor bias error in compass heading as well as in pitch and roll orientations.

In this application tumbling of the IMU means a rotating motion of the IMU around a substantially horizontal body fixed axis. Tumbling includes rotating at varying speeds and in varying directions and at intermittent time intervals. For example, tumbling includes continuous rotation in one direction and intermittent rotation in one direction around this horizontal axis. It also includes continuous or intermittent rotating back and forth around this axis. It includes 360 degree rotation and it includes rotation that is less that 360 degrees in each direction.

The entire inertial measuring unit can undergo the tumbling. Alternatively, one or more angular rate sensors can be separately mounted to perform the tumbling while other components remain stationary.

In one embodiment tumbling is provided by an active component, such as a motor. In another embodiment the tumbling is provided by the device on which the angular rate sensor or the inertial measurement unit (IMU) is mounted. In this embodiment, the energy for the tumbling may also be provided by ordinary movement of the device on which the inertial sensor unit is mounted, such as a shoe during walking or running In one embodiment of such a passive system a ratchet keeps the rotation going in one direction.

Active tumbling with an actuator, such as a motor, allows for about equal time in vertical and horizontal orientations and allows the bias correction calculation to be made frequently and reliably at each orientation. Tumbling around 360 degrees also provides benefit by canceling heading errors. Tumbling with a motor around a horizontal axis provides adequate time in each orientation to measure and correct for the angular rate sensor bias error. Providing a period for the tumbling that is less than the bias error time constant allows for its timely correction before substantial error has accumulated.

While in embodiments that keep rotating in the same direction a slip ring may be used to provide power and ground and communicate data. In embodiments that only rotate back and forth a slip ring may be omitted.

If the device on which system 20 is mounted is actually experiencing rotation about the X axis then the angular rate of that rotation will be measured by angular rate sensor G1, as illustrated in FIG. 1a. The angular displacement around the X axis measured by angular rate sensor G1 can be obtained by time integrating the output of G1 for comparison with the orientation angle measured by accelerometers A3 and A2. The acceleration measured by A3 and A2 will vary with rotation around the X axis because each primarily measures a portion of the acceleration of gravity. That portion varies from a maximum value of ±g when the accelerometer is oriented parallel to the vertical axis to zero when the accelerometer is oriented perpendicular to the vertical axis. For example, for accelerometer A3:

$$\theta = \cos^{-1} a_3/g$$

where $a_3$ is the acceleration measured by accelerometer A3, g is the acceleration of gravity, and $\theta$ is the angle of accelerometer A3 to the gravity vector which changes as the device on which system 20 is mounted rotates around the X axis.

Of course, accelerations measure linear accelerations as well as gravity. But linear accelerations average to 0 over time. Therefore the measured acceleration averaged over time usually provides a good estimate of the orientation of the sensor with respect to the gravity direction.

Figure 2:
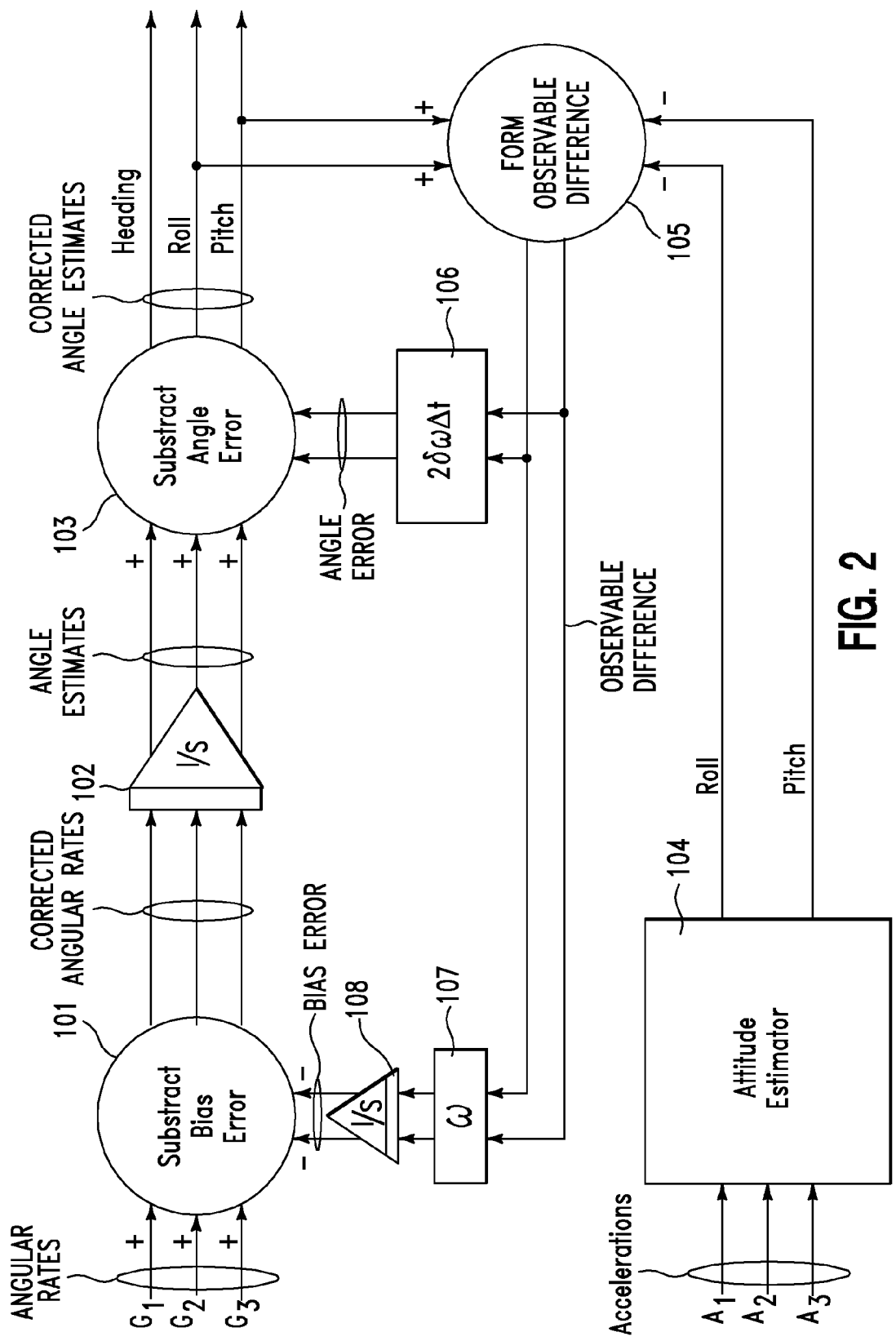
FIG. 2 is a block diagram showing the algorithm for determining bias and bias error by fusing data from angular rate sensors and accelerometer sensors and calculating pitch, roll, and compass heading.

Any difference observed between the measurement obtained from G1 and from one of the accelerometers A3 and A2 is then used to determine the angular rate sensor bias error in pitch and roll directions, as illustrated in the flow chart of FIG. 2.

Another way an observable difference can be obtained is by comparing a velocity computed from angular rate sensor and accelerometer measurements with a separate determination of velocity. In one embodiment, the separate determination of velocity is a velocity of zero. For example, the system may be used for personnel navigation and for this it may be mounted on the shoe of a pedestrian. The velocity of the shoe is zero during the time the person has his or her foot placed down on the floor. The rest of the person's body may be moving but the shoe is stationary while momentarily resting on the floor at each step. Since at each step, while the shoe is on the floor, its velocity is zero in all directions, correction of angular rate sensor bias error for pitch and roll rotations can be obtained, as described in the Foxlin paper. But this technique still does not allow for correction of compass heading angular rate sensor bias error without also introducing additional sensors, such as GPS or magnetometers.

Figure 1B:
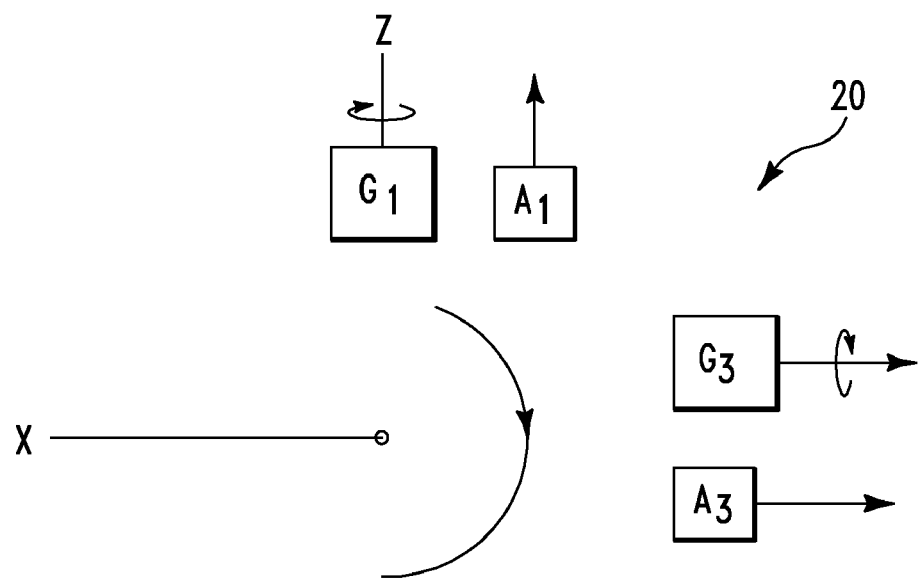

In one embodiment of the present patent application, tumbling around a horizontal axis, such as the Y axis, is provided to system 20, the inertial measurement unit, as shown in FIGS. 1a, 1b. Tumbling allows accelerometers in the inertial measurement unit to provide measurements that can be used to correct angular rate sensor bias error of one or more angular rate sensors used to measure compass heading. In one embodiment, the angular rate sensor bias error accurately measured for angular rate sensor G1 with accelerometers A3 and A2, while angular rate sensor G1 has a substantial horizontal component, as shown in FIG. 1a, while angular rate sensor G1 has rotated to the position of FIG. 1b, where angular rate sensor G1 is used to measure the angular rate of change of compass heading.

While only two positions of inertial measurement unit 20 are shown in FIGS. 1a, 1b, in this embodiment, additional measurements taken while the system is in the process of rotating from the position of FIG. 1a to the position of FIG. 1b can also be used to repeatedly measure and correct angular rate sensor bias error of angular rate sensor G1. A sample rate in the range from 10 to hundreds or thousands of samples per second is used. Of course, as angular rate sensor G1 rotates toward the Z axis, accelerometer A3 provides an acceleration approaching zero, and its contribution to error correction decreases.

Similarly, while it was in the horizontal position of FIG. 1b, angular rate sensor G3 is oriented to measure angular rate around the x axis, and its angular rate sensor bias error can be measured and corrected. This correction continues to be used when rotation of the system provides angular rate sensor G3 parallel to the Z axis, either along ±Z, when angular rate sensor G3 is the angular rate sensor used for measuring the angular rate of change of compass heading.

In this example both angular rate sensors G1 and G3 constantly change places from having a substantial horizontal orientation, where angular rate sensor bias error can be measured and corrected, to a substantial vertical orientation, where the angular rate sensor bias error correction obtained while its orientation was substantially horizontal, is used to correct its output. Meanwhile, angular rate sensor G2, which rotates with the system tumbling around the horizontal Y axis (into and out of the paper), continuously has its angular rate sensor bias error measured by accelerometers A1 and A3 and corrected.

The various embodiments of the present system use an algorithm to combine output data from multiple inertial sensors to produce a better estimate of orientation, velocity and position than any single one of the sensors could provide by itself. Such an algorithm, sometimes called a fusion filter, use data from multiple sensors to detect and correct the bias error of the angular rate sensors.

A $2^{nd}$ order complementary filter design of a fusion filter, as used to measure and correct attitude and heading angular rate sensor bias error for an AHRS is shown in the flow chart of FIG. 2. The flow chart provides a loop that is implemented as a program running on a digital processor. The processing loop cycle is operated at a high repetition rate, such as tens of times per second to thousands of times per second. The filter is making a small correction in each loop cycle, and accurate error detection uses many loop cycles of filter operation.

The angular rates provided by the three angular rate sensors, G1, G2, G3, and the accelerations provided by the three accelerometers, A1, A2, A3, form the inputs to this complementary filter.

The current angular rate bias errors obtained from block 108 are subtracted from the angular rate signals, as shown in block 101.

The corrected angular rate signals are then time integrated in order to update the current angle estimates of attitude and heading, illustrated here as the pitch, roll, and heading angles, as shown in block 102.

In the case of strapdown AHRS systems, in which the sensors in the AHRS system are attached to the device and moving with the device, this time integration is highly non-linear because the orientation of sensors G1, G2, G3 and A1, A2, A3 are changing as you compute their orientation. Because of that movement there is no closed-form solution for the general case of linear acceleration and rotation around more than one axis. Numerical techniques based on simplifying assumptions are typically used. The simplifying assumptions may ignore higher order terms and may provide that the acceleration and angular rate vary linearly between sample data points, These techniques are described in the book, *Strapdown Analytics*, by Paul G. Savage, published by Strapdown Associates, 1997, incorporated herein by reference.

The current angle error, the output of box 106, is subtracted from the angle estimates provided as an output of box 102, to form the system's corrected attitude and heading angle estimates, as shown in block 103.

The accelerations measured by the accelerometers are used to estimate attitude—the pitch and roll angles—as shown in block 104. In this calculation, because linear accelerations are assumed to cancel over time, the direction of the measured acceleration vector, components of which are measured by each accelerometer, is assumed to equal to the direction of the gravity vector, which is identical to the vertical direction.

The estimate of pitch and roll angle generated by the attitude estimator is subtracted from the corrected pitch and roll angle estimates, as shown in block 105, to form the system's observable difference, which is in the form of an estimate of the angle error for pitch and roll.

The angle error estimate is then multiplied by a scaling constant, $2\delta\omega$, as shown in block 106. The output of block 106 is the current angle error which is used in block 103.

The observable difference from box 105 is also multiplied by the scaling constant, w, as shown in block 107. The output of block 107 is time integrated in block 108 to provide the current bias error, which is used in block 101 for a subsequent sample.

For many years an important limitation in this implementation has been that no heading information has been obtainable from the accelerometers. The accelerometer outputs can only be used to estimate pitch and roll, and not heading. This means that the observable difference in the prior art has only been formed in the pitch and roll angles. Consequently, the only angle errors that have been detected and corrected for are errors in pitch and roll. Likewise, the only angular rate sensor bias errors that have been corrected are those which directly contribute to pitch and roll errors. Heading errors, and angular rate sensor bias errors that contribute to heading errors, have not been detected.

Figure 3A:
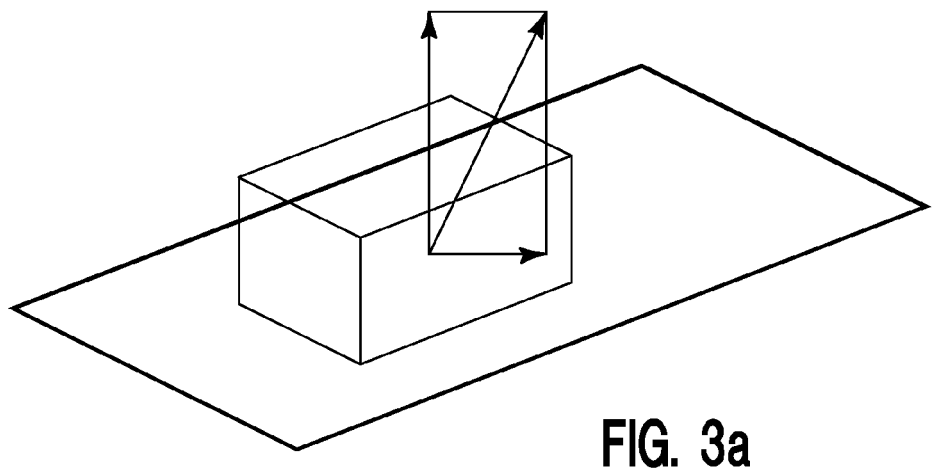
FIG. 3a is a three dimensional vector diagram showing how contribution of angular rate sensor bias error from all three angular rate sensors contributes to provide an angular rate sensor bias error vector.
Figure 3B:
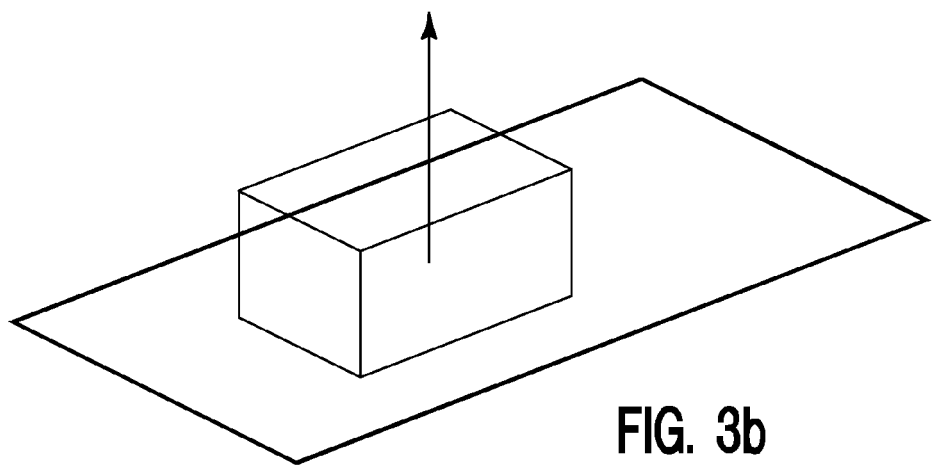
FIG. 3b is a three dimensional vector diagram showing how the horizontal component of angular rate sensor bias error is removed and how the vertical component of angular rate sensor bias error remains after operation of a fusion filter that includes contribution from the angular rate sensors and the accelerometers in a stationary system.

Taken together, the bias errors of all three angular rate sensors can be considered as a vector quantity as shown in FIG. 3a. Up until the present patent application, the sensor fusion filter shown in FIG. 2, or the algorithm described in the Foxlin paper, was used to detect and correct only the horizontal component of this vector. But the accelerometer data was not capable of detecting or correcting the vertical component. Therefore, as the filter operated over time, the vertical component of the bias error vector remained as shown in FIG. 3b.

A property of the angular rate sensor bias error vector is that it is fixed with respect to the angular rate sensors themselves. If the three angular rate sensors are tumbled as a unit, then the bias error vector will tumble with them. In contrast, the horizontal plane remains stationary, that is, the horizontal plane does not tumble with the inertial sensors. The present applicant recognized that this means that the remaining bias error vector can be rotated into the horizontal plane.

Until the present applicant discovered his system, these errors were not measurable and were not mathematically observable when the sensor system included only accelerometers and angular rate sensors.

Figure 4A:
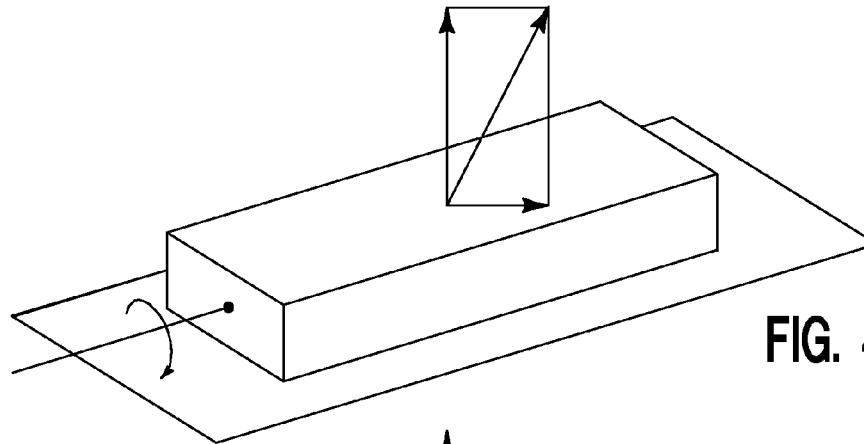
FIGS. 4a-4d are three dimensional vector diagrams showing how the horizontal component of angular rate sensor bias error is removed and how the vertical component of angular rate sensor bias error remains after initial operation of a fusion filter that includes contribution from the angular rate sensors and the accelerometers in a tumbling system and how when the system tumbles remaining bias error is also removed.

The present applicant recognized that implementing tumbling causes the inertial sensors to rotate about a predominantly horizontal axis, as shown in FIG. 4a. While the axis is predominantly horizontal, the axis is not perfectly horizontal because the system of the present patent application is fixed to a device that may undergo pitch and roll, and the axis of rotation moves with the device.

Figure 4B:
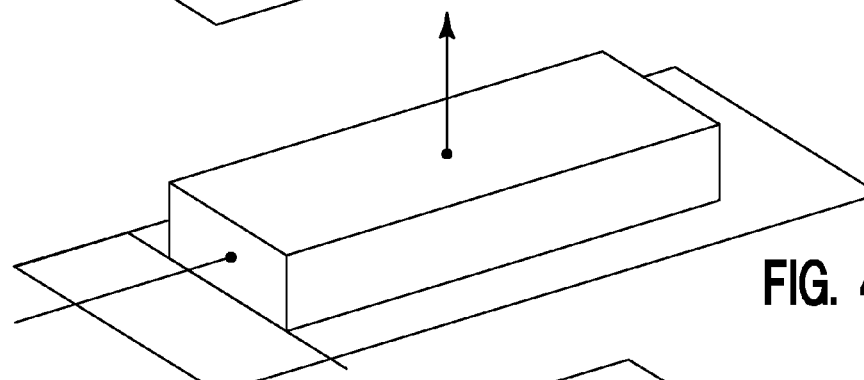
Figure 4C:
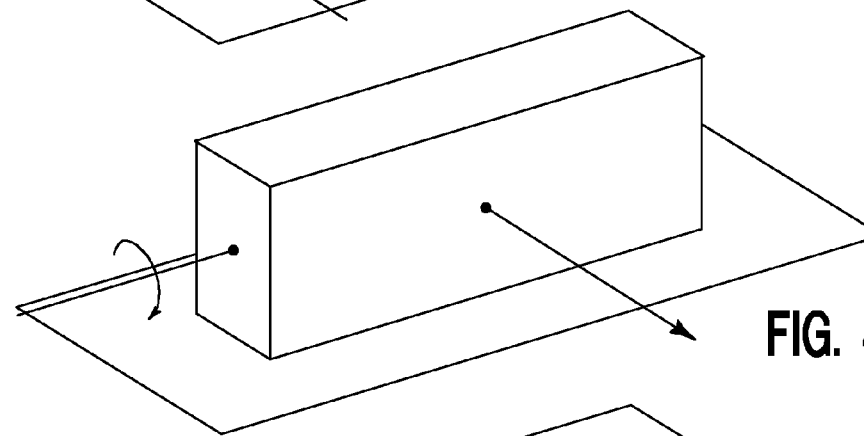
Figure 4D:
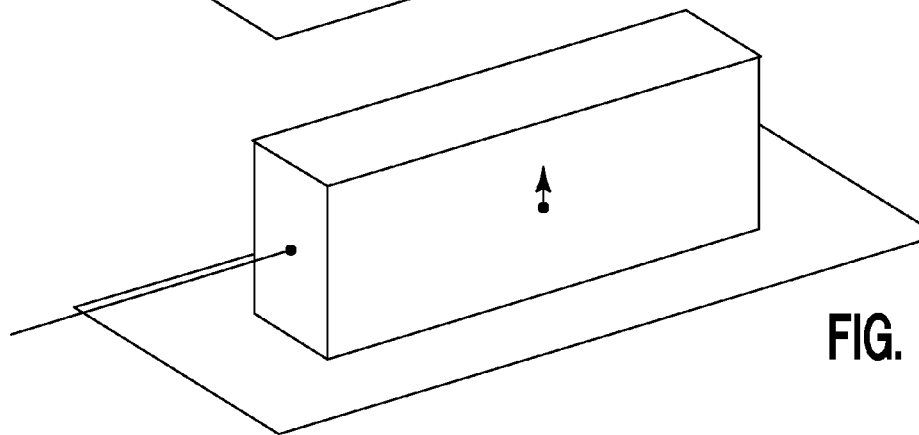

Initially, a general angular rate sensor bias error is present as shown in FIG. 4a. While in this configuration the horizontal component of that bias error vector can be detected and corrected, as described herein above, resulting in the condition shown in FIG. 4b. The bias error remaining in FIG. 4b has an unknown and unmeasurable magnitude. Since the angular rate sensor bias error rotates with the sensors, the act of rotating inertial sensing unit into the position of FIG. 4c also rotates that remaining bias error vector. Thus, the remaining bias error is now predominantly horizontal. Now horizontal, this previously unknown and unmeasurable component can now be detected and corrected for, as shown in FIG. 4d.

The technique is tolerant of imperfections caused by the fact that the tumbling axis may not be precisely horizontal and may vary with time. If the tumbling axis is offset from horizontal, then the component of the bias error vector that is left uncorrected for any measurement is proportional to sin $\alpha$ where $\alpha$ is the angular deviation of the tumbling axis from horizontal.

The tumbling procedure has resulted in a condition whereby the heading angular rate sensor bias errors are more fully detected and corrected and heading is more accurately determined. This leads to improvements in the system's ability to estimate heading, velocity, and position.

The tumbling system of the present patent application is also useful for tracking the movements of pedestrians, such as firefighters, in environments when GPS signals are not available, such as indoors and in downtown areas of cities.

The inertial personnel tracking system includes a tri-axial angular rate sensor, a tri-axial accelerometer, and a sensor fusion filter. The inertial personnel tracking system provides location or position of the pedestrian over time as an output. In the inertial personnel tracking system embodiment, the angular rate sensors and the accelerometers are treated differently than in the AHRS embodiment. The outputs of the three angular rate sensors are digitized and time integrated in the processor to provide an orientation estimate. An A/D converter can be used to digitize the outputs of the sensors. This estimate is used to transform the accelerometer outputs from the body fixed coordinate system into the navigation coordinate system. The navigation coordinate system is usually fixed to the earth or to inertial space, such as the north, east and down directions, a navigation coordinate system useful to a user. The body coordinate system is fixed to the moving body and therefore rotates and translates with the moving body. The sensors provide their measurements in the body fixed coordinate system. The accelerations measured by the three accelerometers are then time integrated to estimate the three components of the velocity vector. The velocity is then time integrated to estimate position.

However, with bias errors inherent in low cost inertial sensors such free-inertial navigation solutions are susceptible to errors which grow rapidly over time, as described herein above. Error detection and correction is useful to prevent the solution from very quickly degrading, and this error detection and correction may be provided in the sensor fusion filter implemented in the form of a Kalman filter.

During normal walking, the foot is stationary at each step on the floor. If the IMU is mounted to the pedestrian's foot, then during the time the foot is in contact with the floor, that IMU is stationary. Therefore, the velocity of that IMU is zero. The fact that the IMU is moving at zero velocity at each step on the floor can be used as if this were the output measurement of an actual velocity sensor, even though such a velocity sensor is not part of the system. The absent velocity sensor that provides the zero velocity information at each step is referred to as a pseudosensor. The information obtained from this pseudosensor is derived from the knowledge that velocity is zero at each step rather than from an actual sensor reading of any kind.

Whenever the velocity is known to be zero, the velocity pseudosensor can be used to form an observable difference which is the difference between the velocity output of the navigation solution obtained by double integration of the accelerometer output and the velocity output of the velocity pseudosensor, which is zero velocity. Whenever this observable difference is established, the filter detects and corrects for errors, including the angular rate sensor bias errors, accelerometer bias, attitude bias, and velocity errors.

As with the conventional AHRS system described herein above, in the prior art, the observable difference so formed has not provided any information about the vertical component of the angular rate sensor bias error. Heading errors, and the angular rate sensor bias errors which contribute to heading errors, have not been detected and corrected in prior art systems except if additional sensors were introduced, such as magnetometers or GPS. A change in the heading error, or a change in the vertical component of the angular rate sensor bias error will not affect the value of the observable difference found when the foot contacts the floor. Conversely, measuring the observable difference when the foot contacts the floor provides no information about the magnitude of the heading error or the vertical component of the angular rate sensor bias error in prior art systems that included angular rate sensors and accelerometers but not magnetometers or GPS.

However, as with the AHRS system, implementing tumbling in the inertial personnel tracking system allows determination and correction of heading error and angular rate sensor bias error. The inertial sensing device that was vertically oriented and providing rate of change of compass heading information rotates about a substantially horizontal axis. Since the bias error vector is fixed to the inertial sensor, the bias error vector also rotates about the substantially horizontal axis. The Kalman filter operates over time to detect and eliminate the horizontal component of the angular rate sensor bias error. As it does so, the uncorrected component, that had been vertical, has now become substantially horizontal, and the Kalman filter can detect and correct for this error. The result is that all components of the angular rate sensor bias error can be detected and corrected, providing improved heading accuracy, and therefore providing improved horizontal velocity and position accuracy in the navigation solution.

Figure 5A:
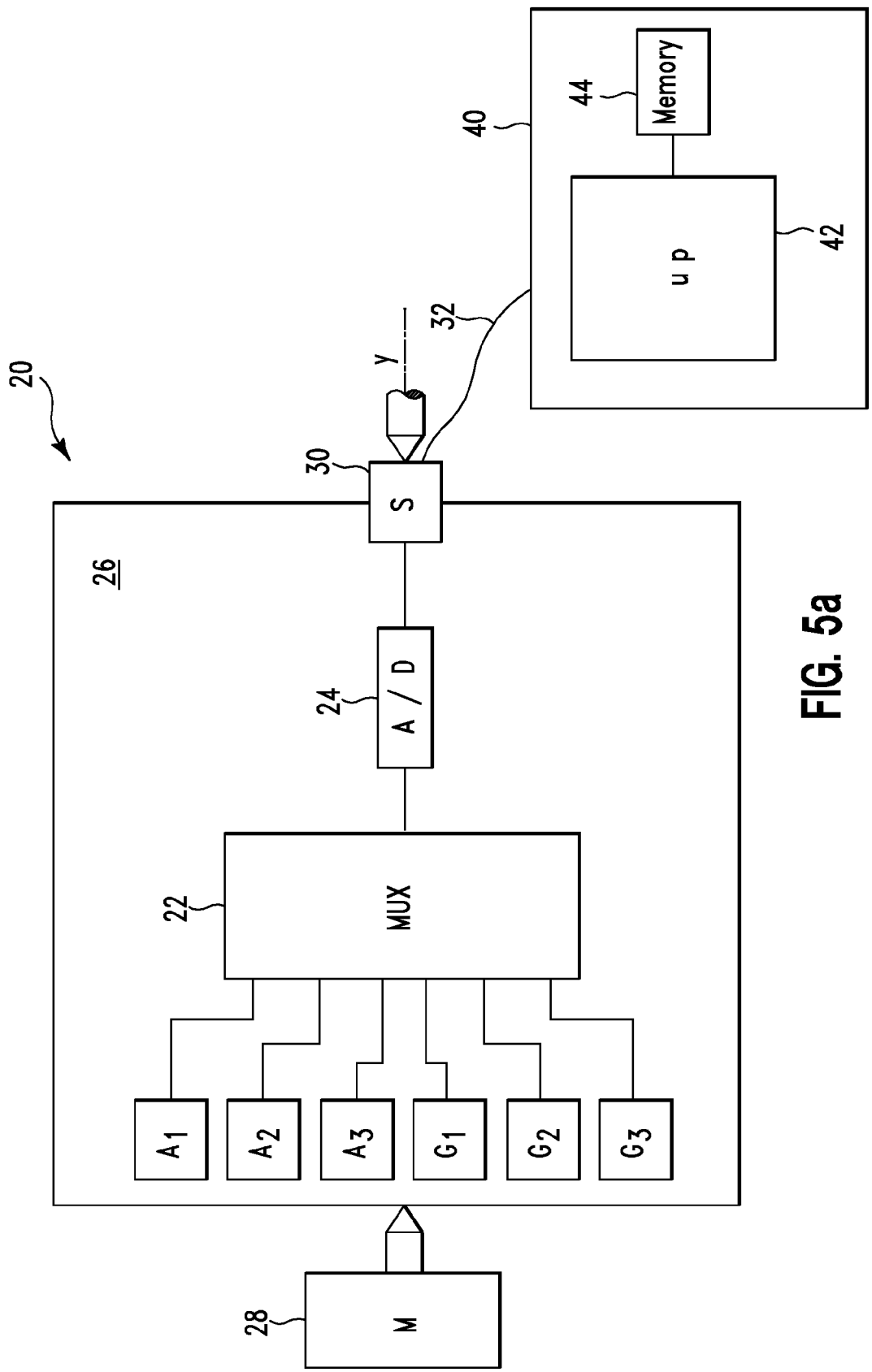
FIG. 5a is an electromechanical block diagram showing a tumbling circuit board with accelerometers and angular rate sensors tumbling as driven by a motor and providing digital output data through a slip ring and a wire to a non-rotating processor.

One embodiment of the system of FIGS. 1a, 1b includes MUX 22 and A/D converter 24 along with accelerometers A1, A2, A3, and angular rate sensors G1, G2, G3 mounted on rotating circuit board 26, rotating around a horizontal axis, such as the Y axis, as driven by motor 28, as shown in FIG. 5a. Power and ground are brought in and signal is brought out through slip ring 30 and wiring 32 to non-rotating base station 40 that includes microprocessor 42 and memory 44 which run an algorithm described herein below. Base station 40 can also include an output device, such as a display for showing such navigation information as location and orientation. Base station 40 can also log data and provide input to a control system that uses navigation information as an input.

In one embodiment, the IMU has a dimension of 1.5 inches in diameter by 3 inches long. In one embodiment the actuator provides rotation with a period that is less than the time constant of the Markov process that describes the change in angular rate sensor bias error. For example a period for the rotation in the range from 10 to 1000 seconds can be used.

Accelerometers, such as the ADXL210 and angular rate sensors, such as the ADXRS610 manufactured by Analog Devices, Norwood, Mass. may be used.

Figure 5B:
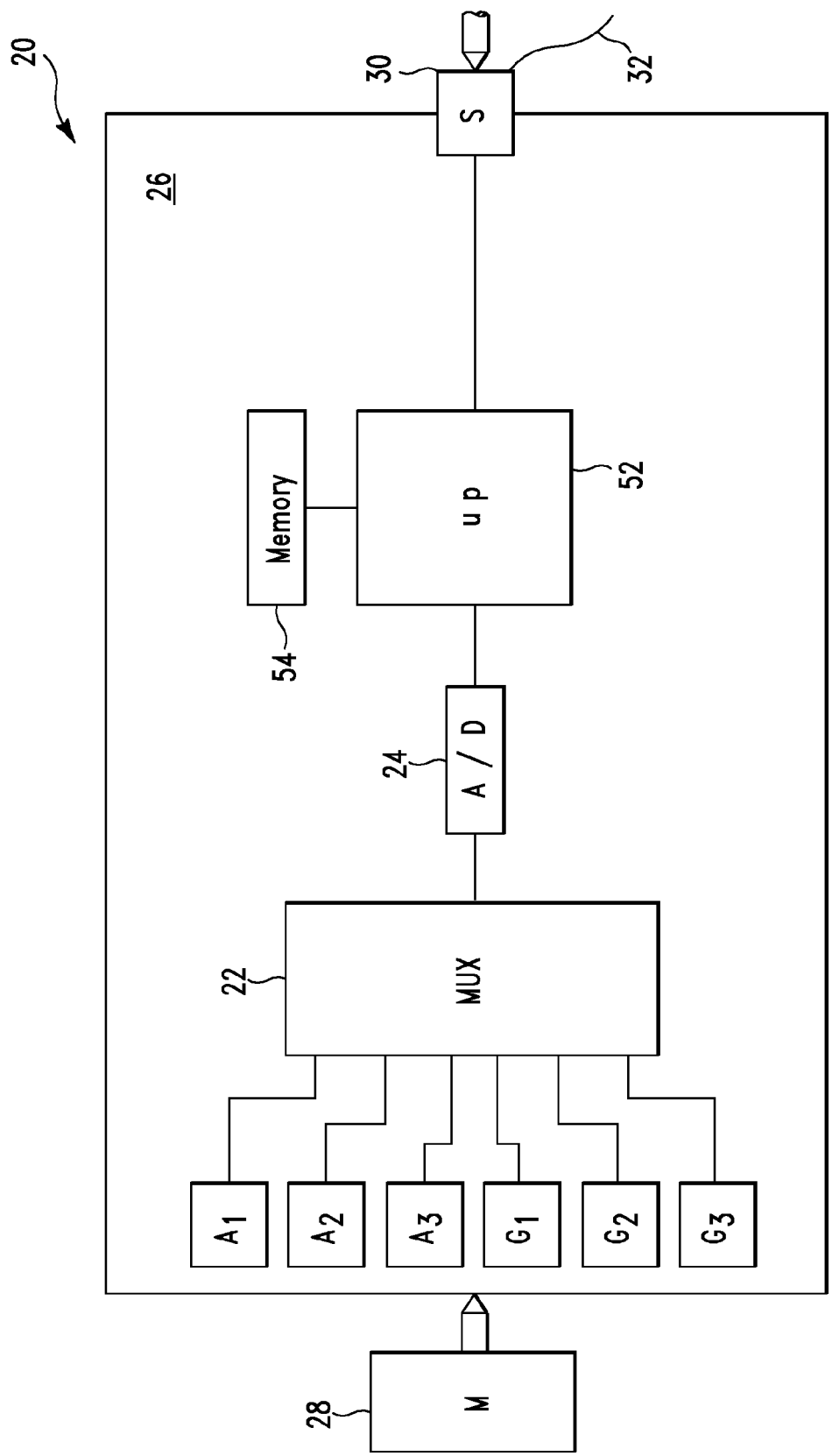
FIG. 5b is the electromechanical block diagram of FIG. 5a with additional components, including a processor and memory on the tumbling circuit board.

Another embodiment includes microprocessor 52 and memory 54 on rotating circuit board 26 along with the other components, as shown in FIG. 5b. In this case processed data is brought out through slip ring 30 and wiring 32 while power and ground are brought in through slip ring 30. In this case processed data may go to a base station for displays, logging in a data file, or for input to a control system.

Figure 5C:
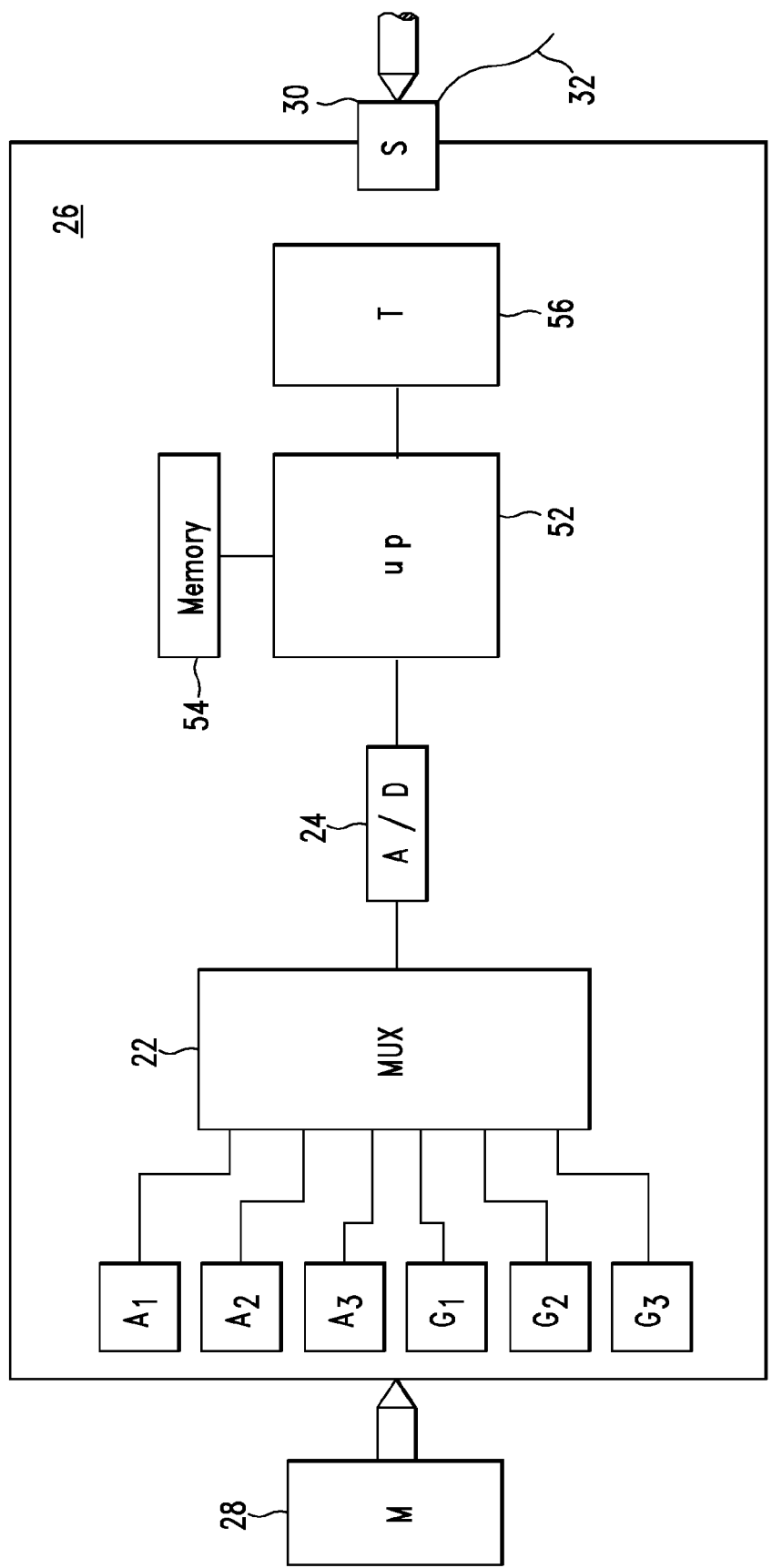
FIG. 5c is the electromechanical block diagram of FIG. 5b with additional components, including a transceiver on the tumbling circuit board.

Another embodiment includes microprocessor 52, memory 54, and transceiver 56 on rotating circuit board 26 along with the accelerometers A1, A2, A3, angular rate sensors G1, G2, G3, MUX 22, and A/D converter 24, as shown in FIG. 5*c*. In this case processed data is transmitted out while power and ground are still brought in through slip ring 30 and wiring 32.

Figure 5D:
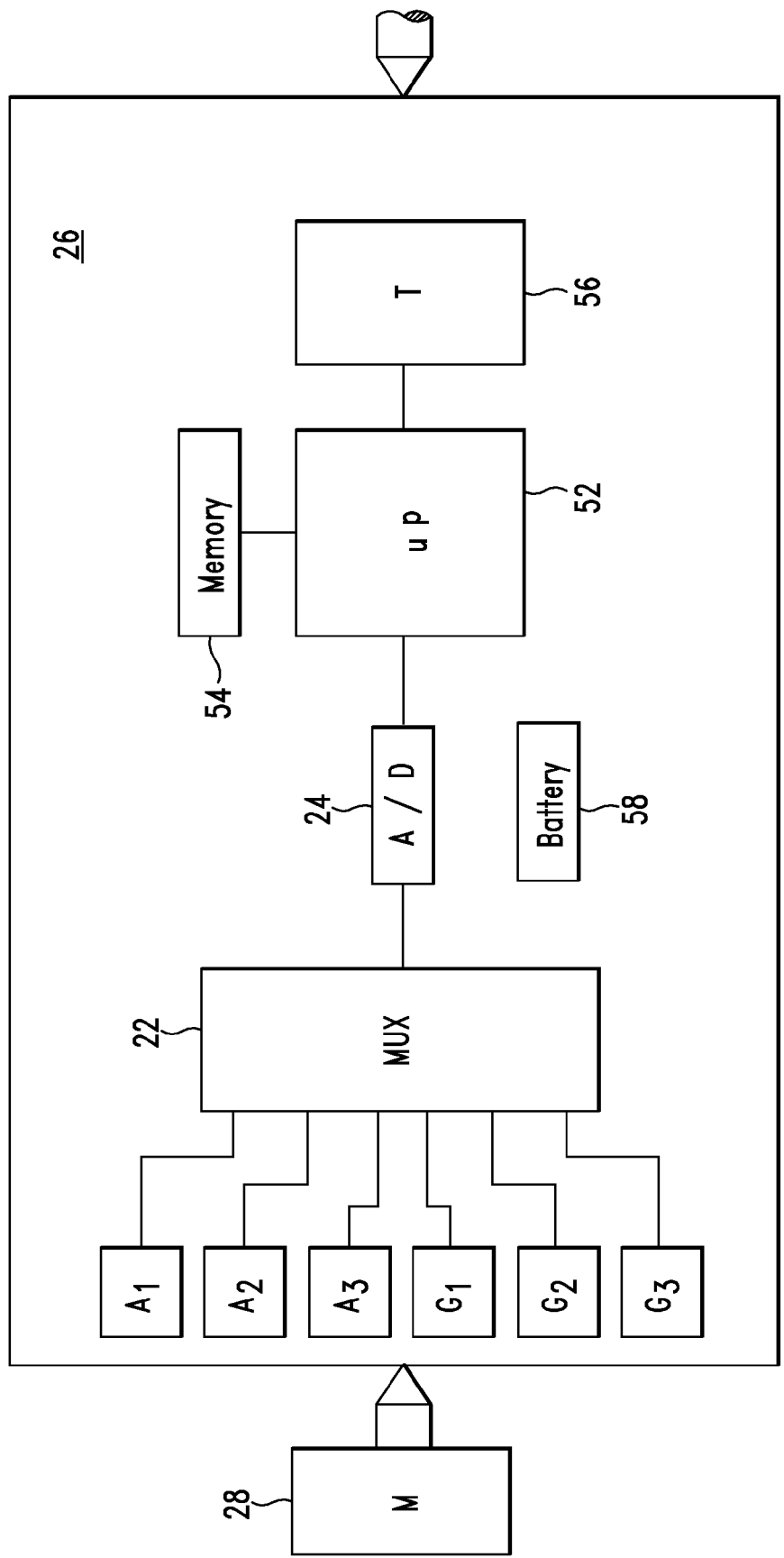
FIG. 5d is an electromechanical block diagram similar to FIG. 5c but with a battery on the tumbling circuit board so power connection and the slip ring can be eliminated.

Another embodiment also includes battery 58 on rotating circuit board 26 along with accelerometers A1, A2, A3, angular rate sensors G1, G2, G3, MUX 22, A/D converter 24, microprocessor 52, memory 54, and transceiver 56 on rotating circuit board 26, as shown in FIG. 5*d*. In this case processed data is transmitted out while power and slip ground are provided by battery 58.

Figure 6A:
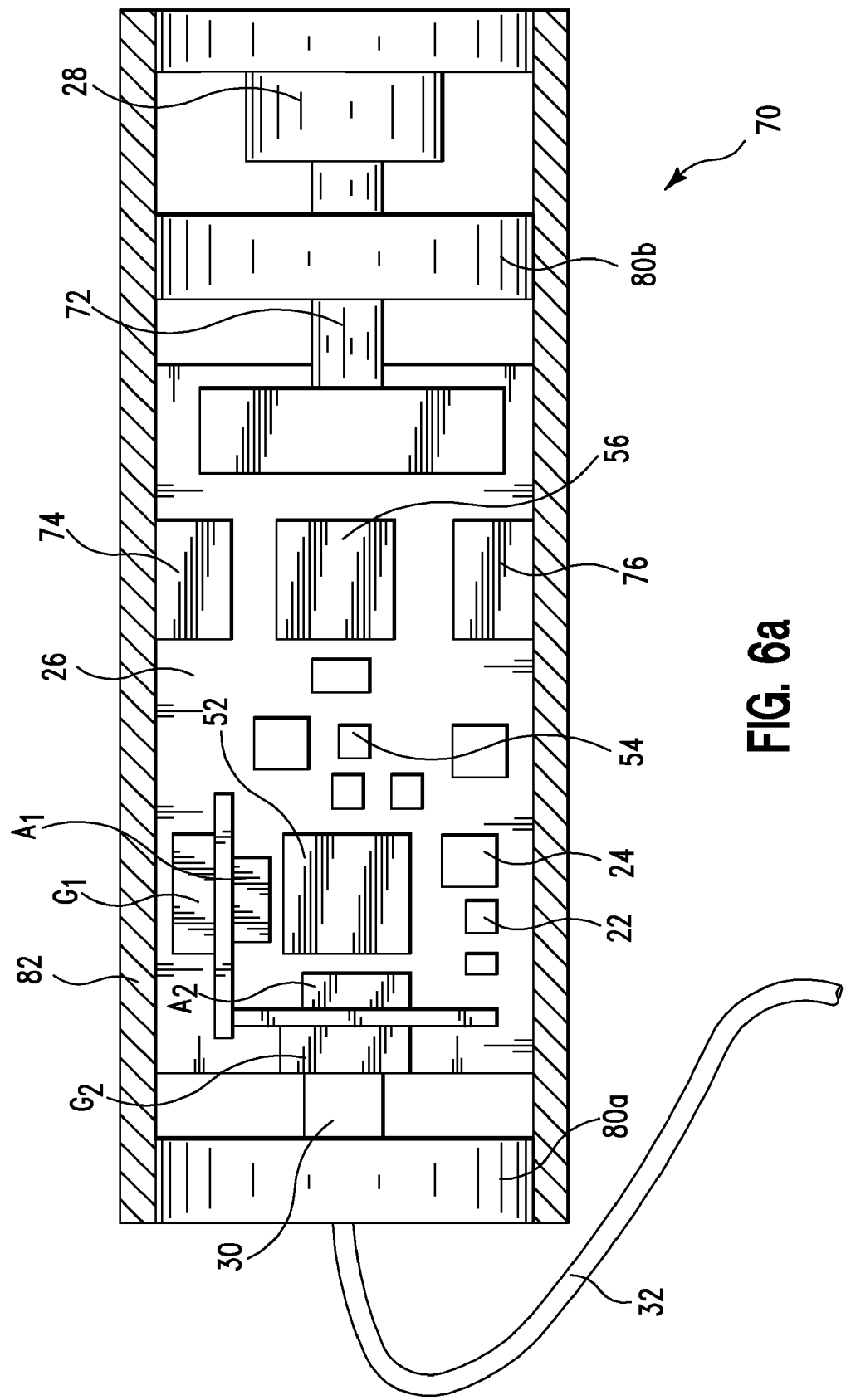
FIG. 6a is a top view and FIG. 6b a three dimensional view of a tumbling inertial measurement unit having the circuit board of the embodiment of FIG. 5c mounted in an enclosure and tumbling on a shaft supported by bearings in the enclosure.
Figure 6B:
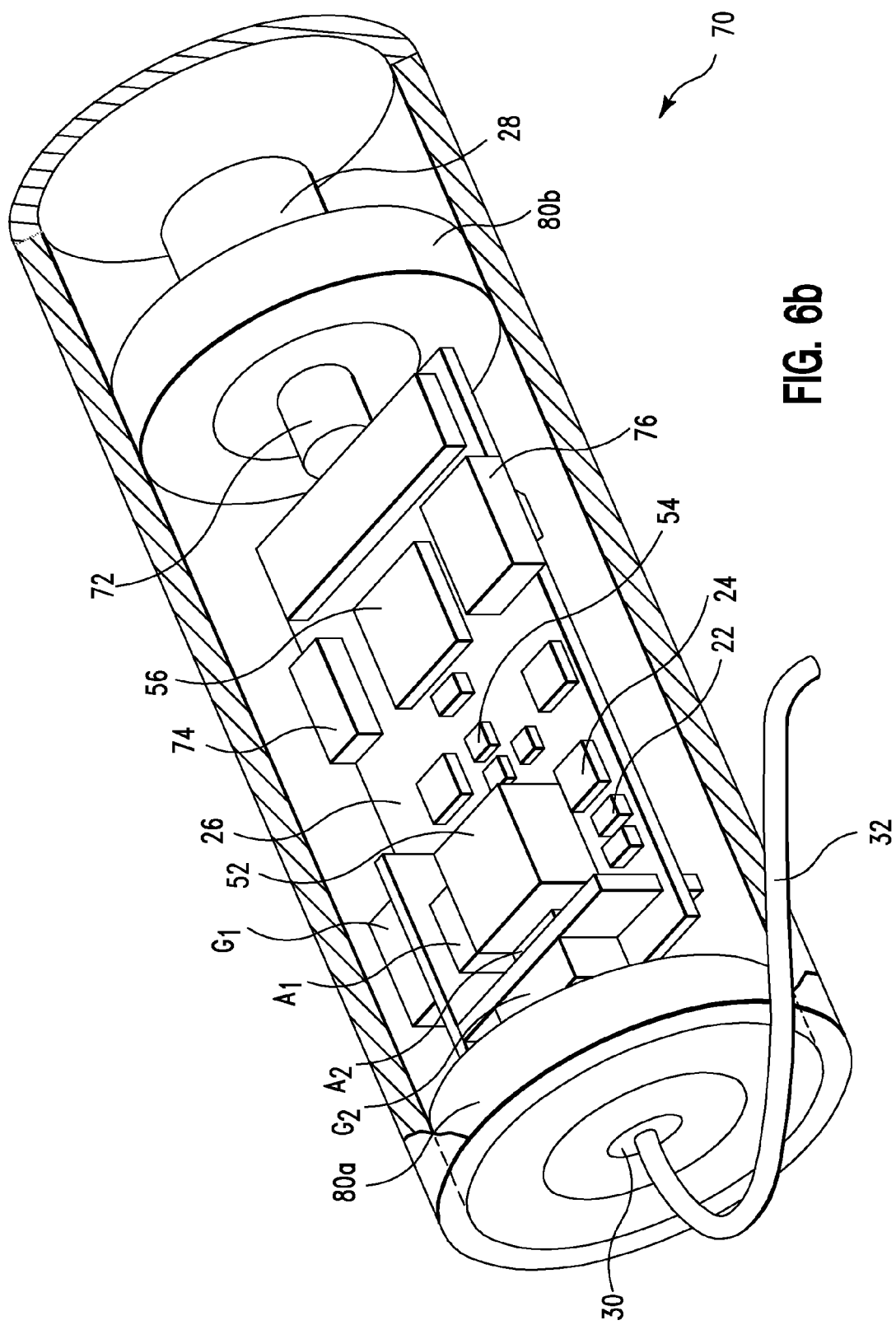

In one embodiment, inertial measurement unit 70 includes circuit board 26 mounted to horizontal rotating shaft 72, as shown in FIGS. 6*a*, 6*b*. Circuit board 26 includes accelerometers A1, A2, A3, angular rate sensors G1, G2, G3, MUX 22, A/D converter 24, microprocessor 52, memory 54, transceiver 56, power conditioning circuit 74, antenna 76. Horizontal rotating shaft 72 is mounted between bearings 80*a*, 80*b* and is driven by motor 28. Support bearings 80*a*, 80*b* are mounted on enclosure 82, which is mounted to the device (not shown) whose navigation is being tracked.

Figure 7B:
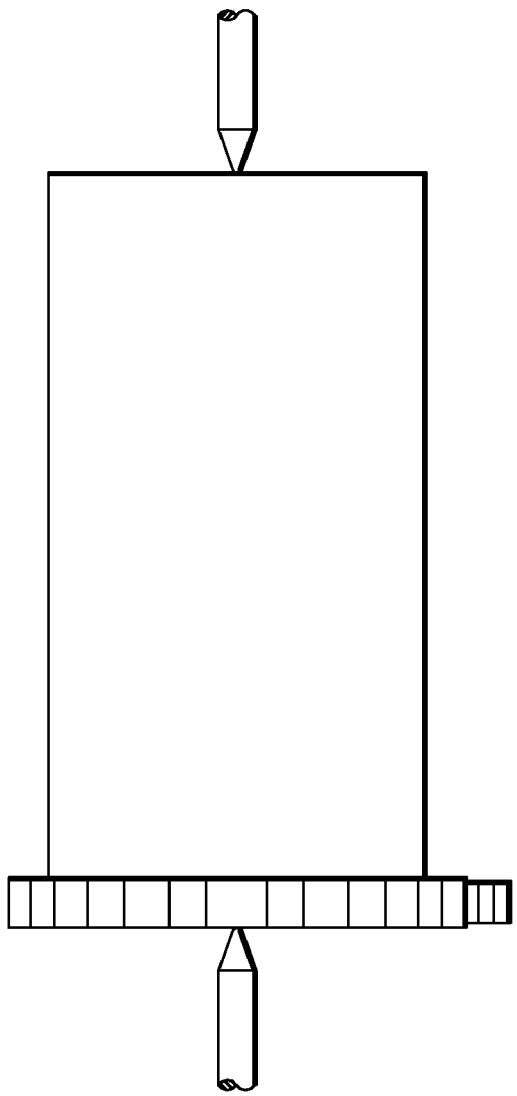
FIGS. 7a and 7b are schematic diagram showing a tumbling circuit board like those of FIGS. 5a-5d passively tumbling in one direction by use of a ratchet mechanism.
Figure 7A:
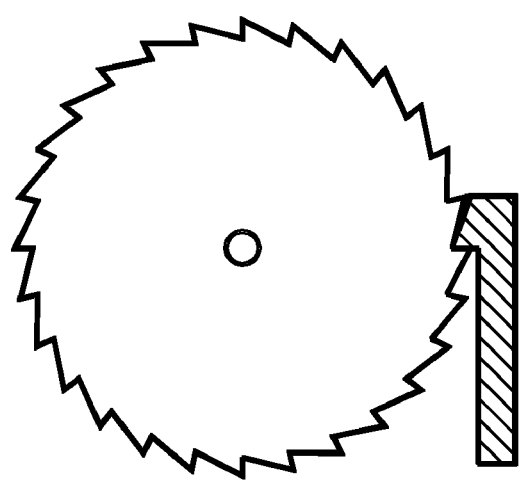

In another embodiment, tumbling is driven passively by ordinary motion of the device on which the IMU is mounted. In such an arrangement, a ratchet system can be implemented to provide that the circuit board is restricted to rotate in one direction, as shown in FIGS. 7*a*, 7*b*.

While the disclosed methods and systems have been shown and described in connection with illustrated embodiments, various changes may be made therein without departing from the spirit and scope of the invention as defined in the appended claims.

What is claimed is:

1. A method, comprising:
    a. providing an angular rate sensor and a direction-of-gravity reference; and
    b. determining bias error of said angular rate sensor about a vertical axis based on data substantially from said angular rate sensor and from said direction-of-gravity reference.

2. A method as recited in claim 1, wherein said determining bias error of said angular rate sensor about a vertical axis is based on data exclusively from said angular rate sensor and from said direction-of-gravity reference.

3. A method as recited in claim 1, wherein said direction-of-gravity reference includes at least one accelerometer.

4. A method as recited in claim 1, further comprising tumbling said angular rate sensor around a substantially horizontal axis.

5. A method as recited in claim 1, wherein said providing an angular rate sensor and a direction-of-gravity reference involves providing triaxial angular rate sensors and triaxial accelerometers, wherein said triaxial angular rate sensors are approximately orthogonally mounted, and wherein said triaxial accelerometers are approximately orthogonally mounted, and wherein said triaxial angular rate sensors and said triaxial accelerometers are mounted in a housing, wherein said housing includes an motor for tumbling said triaxial angular rate sensors around said substantially horizontal axis.

6. A method as recited in claim 1, wherein said angular rate sensor primarily provides angular rate data for attitude for a first fraction of time and wherein said angular rate sensor primarily provides angular rate data for compass heading for a second fraction time, wherein said first fraction and said second fraction are substantially equal.

7. A method as recited in claim 1, further comprising mounting said angular rate sensor and said direction-of-gravity reference on a structure.

8. A method as recited in claim 7, wherein said structure includes an article for wearing by a person.

9. A method as recited in claim 8, wherein said article for wearing by a person includes footwear.

10. A method as recited in claim 1, further comprising moving said angular rate sensor from a first position around a substantially horizontal axis to a second position around said substantially horizontal axis, wherein said angular rate sensor provides angular rate data for attitude at said first position and for compass heading at said second position.

11. A method as recited in claim 10, wherein said moving said angular rate sensor involves using a motor to move said angular rate sensor.

12. A method as recited in claim 11, wherein said angular rate sensor has a bias time constant, wherein said motor provides tumbling, wherein period of tumbling is less than said bias time constant.

13. A method as recited in claim 10, further comprising processing data from said angular rate sensor and from said direction-of-gravity reference with a program for determining a bias error correction for said angular rate sensor while said angular rate sensor is in said first position.

14. A method as recited in claim 13, further comprising using said bias error correction determined while said angular rate sensor is in said first position to correct angular rate of said angular rate sensor while said angular rate sensor is in said second position.

15. A method as recited in claim 13, wherein said processing data involves using a processor.

16. A method as recited in claim 15, further comprising providing said processor to move with said angular rate sensor.

17. A method as recited in claim 16, further comprising providing a transceiver to move with said angular rate sensor, and using said transceiver to transmit corrected heading data.

18. A method as recited in claim 17, further comprising using said transceiver to transmit corrected velocity and position data.

19. A method, comprising
    a. providing an angular rate sensor and an inertial sensor; and
    b. determining bias error of said angular rate sensor about a vertical axis based on data substantially from said angular rate sensor and from said inertial sensor.

20. A method as recited in claim 19, wherein said determining bias error of said angular rate sensor about a vertical axis is based on data exclusively from said angular rate sensor and from said inertial sensor.

21. A method as recited in claim 19, wherein said angular rate sensor primarily provides angular rate data for attitude for a first fraction of time and wherein said angular rate sensor primarily provides angular rate data for compass heading for a second fraction time, wherein said first fraction and said second fraction are substantially equal.

22. A method of navigation, comprising
    a. providing an angular rate sensor and a direction-of-gravity reference;
    b. moving said angular rate sensor from a first position around a substantially horizontal axis to a second position around said substantially horizontal axis, wherein said angular rate sensor provides angular rate data for attitude at said first position and for compass heading at said second position;

c. processing data from said angular rate sensor and from said direction-of-gravity reference with a program for determining a bias error correction for said angular rate sensor while said angular rate sensor is in said first position; and d. using said bias error correction determined while said angular rate sensor is in said first position to correct angular rate of said angular rate sensor while said angular rate sensor is in said second position.

23. A method as recited in claim 22, wherein said direction-of-gravity reference includes at least one accelerometer.

24. A method as recited in claim 22, wherein said providing an angular rate sensor and a direction-of-gravity reference involves providing triaxial angular rate sensors and triaxial accelerometers, wherein said triaxial angular rate sensors are approximately orthogonally mounted, and wherein said triaxial accelerometers are approximately orthogonally mounted, and wherein said triaxial angular rate sensors and said triaxial accelerometers are mounted in a housing, wherein said housing includes a motor for tumbling said triaxial angular rate sensors around said substantially horizontal axis.

25. A method as recited in claim 22, wherein said angular rate sensor primarily provides angular rate data for attitude for a first fraction of time and wherein said angular rate sensor primarily provides angular rate data for compass heading for a second fraction time, wherein said first fraction and said second fraction are substantially equal.

26. A method as recited in claim 22, wherein said moving said angular rate sensor involves using a motor to move said angular rate sensor.

27. A method as recited in claim 26, wherein said angular rate sensor has a bias time constant, wherein said motor provides tumbling, wherein period of tumbling is less than said bias time constant.

28. A method as recited in claim 22, further comprising mounting said angular rate sensor and said direction-of-gravity reference on a structure.

29. A method as recited in claim 28, wherein said moving said angular rate sensor involves moving said structure.

30. A method as recited in claim 29, wherein said structure includes an article for wearing by a person.

31. A method as recited in claim 30, wherein said article for wearing by a person includes footwear.

32. A method as recited in claim 22, wherein said processing data involves using a processor.

33. A method as recited in claim 32, further comprising providing said processor to move with said angular rate sensor.

34. A method as recited in claim 33, further comprising providing a transceiver to move with said angular rate sensor, and using said transceiver to transmit corrected heading data.

35. A method as recited in claim 34, further comprising using said transceiver to transmit corrected velocity and position data.

36. A sensing unit, comprising:
a direction-of-gravity reference and an angular rate sensor;
an actuator mounted to provide movement of said angular rate sensor from a first position around a substantially horizontal axis to a second position around said substantially horizontal axis, wherein said angular rate sensor provides angular rate data for attitude at said first position and wherein said angular rate sensor provides angular rate data for compass heading at said second position; and
a processor connected to receive data from said angular rate sensor and from said direction-of-gravity reference, wherein said processor runs a program for determining a bias error correction for said angular rate sensor while said angular rate sensor is in said first position and for using said bias error correction to correct angular rate determined by said angular rate sensor while said angular rate sensor is in said second position.

37. A sensing unit as recited in claim 36, wherein said direction-of-gravity reference includes three substantially orthogonal accelerometers and wherein said angular rate sensor is one of three substantially orthogonal angular rate sensors.

38. A sensing unit as recited in claim 36, wherein said processor moves with said angular rate sensor.

39. A sensing unit as recited in claim 36, wherein said processor is mounted separate from said angular rate sensor.

* * * * *